Dec. 17, 1968   I. R. RITSEMA   3,416,331
UNIVERSAL JOINT
Filed June 8, 1967

INVENTOR.
IRVING R. RITSEMA
BY
William N. Antonis
ATTORNEY

United States Patent Office 3,416,331
Patented Dec. 17, 1968

3,416,331
UNIVERSAL JOINT
Irving Ray Ritsema, South Bend, Ind., assignor to The Bendix Corporation, a corporation of Delaware
Filed June 8, 1967, Ser. No. 644,665
6 Claims. (Cl. 64—17)

ABSTRACT OF THE DISCLOSURE

The following relates to a universal joint of the type sometimes referred to as a Hooke's Coupling. The universal joint consists of two angularly disposed rotatable tubular members, each of which has a forked portion formed on the end thereof, and a block having two pairs of diametrically opposed protruding spherical surfaces formed thereon which are guided into trapped engagement with concave seats formed in the forked portion through means of inclined grooves which are formed in the forked portion and extend into the concave seats. The tubular members and components thereof can be stamped out of flat sheets of suitable material.

Background of the invention

No-lash universal joints of the type described herein are disclosed in Runkle Patent No. 3,217,516 and in Runkle Patent No. 3,296,830. In both of these patents adjustable washer-type coupling means are utilized to connect the angularly disposed rotatable fork members and to eliminate the lash therebetween. This particular construction has been found very suitable for steering columns and is presently incorporated in various passenger cars having a tiltable steering column. The univeral joint construction described hereinafter, which was conceived for applications requiring low torque, low speed, and moderate angles, requires fewer parts and is considerably less expensive to fabricate. Furthermore, it is designed so that the joint will be substantially lash-free after the parts thereof are assembled.

Summary of the invention

Accordingly, it is an object of this invention to provide a novel, relatively inexpensive universal joint which is relatively small in size, free from back-lash and which avoids various problems encountered in the assembly of prior art constructions.

Another object of this invention is to provide a lash-free universal joint having a minimum number of parts.

More specifically, it is an object of this invention to provide a universal joint comprising two angularly disposed rotatable tubular members each having a pair of spaced diametrically opposed arms extending therefrom, a block having two pairs of diametrically opposed protruding spherical surfaces formed thereon, concave seats formed in each of the arms for receiving the protruding spherical surfaces, and diametrically opposed grooves formed in the arms of each of the rotatable members which extend from the ends of the arms to the concave seats for guiding and permitting movement of the protruding spherical surfaces into trapped engagement with the concave seats during assembly.

The above and other objects, features, and advantages of the invention will become apparent from the following description taken in connection with the accompanying drawing.

Figure 1:
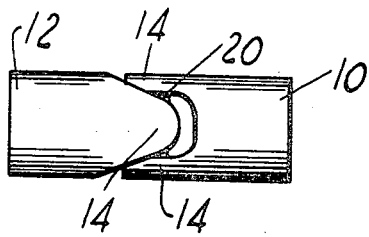
FIGURE 1 shows a plan view of a completely assembled universal joint which incorporates the invention.
Figure 2:
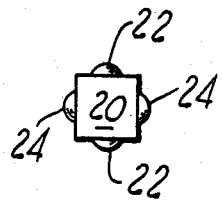
FIGURES 2 and 3 show front and end views, respectively, of the coupling block utilized in the universal joint.
Figure 3:
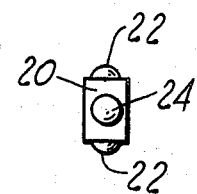
Figure 4:
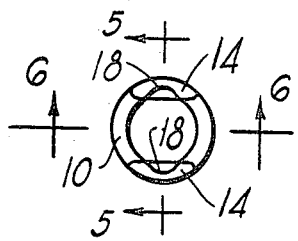
FIGURE 4 shows an end view of one of the forked tubular members utilized in the universal joint.
Figure 5:
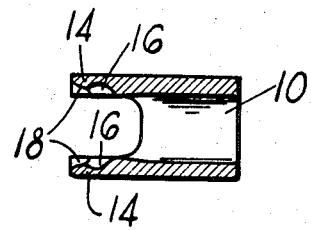
FIGURE 5 is a sectional view taken along line 5—5 of FIGURE 4.
Figure 6:
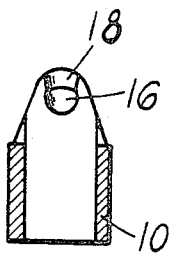
FIGURE 6 is a sectional view taken along line 6—6 of FIGURE 4.

Referring to the drawing, it will be noted that numerals 10 and 12 indicate identical forked tubular members, each of which has a pair of spaced arms 14 located at one end thereof. Diametrically opposed concave seats 16 and inclined grooves 18, which extend from the ends of the arms to the concave seats, are located in each of the arms 14. It will be understood that the concave seats 16 of tubular member 10 are centered in the same plane with the concave seats 16 of tubular member 12, but are located at right angles with respect thereto.

Block 20, which includes a first pair of diametrically opposed protruding spherical surfaces 22 and a second pair of diametrically opposed protruding spherical surfaces 24 which are disposed at right angles with respect to the first pair, is interposed between the spaced arms 14 of the tubular members 10 and 12. These spherical surfaces are adapted to be received in the concave seats 16.

Figure 7:
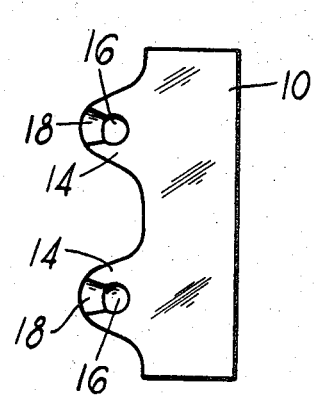
FIGURE 7 is a developed view of the forked tubular member shown in FIGURES 4, 5, and 6.

It will be noted from the foregoing that the joint includes only two forked tubular members 10 and 12, and a center block 20. Each of the forked tubular members 10 and 12 are formed out of sheet metal by stamping or by utilizing any other suitable method to form a pair of arms 14 with concave seats 16 and inclined grooves 18, as shown in FIGURE 7. This stamping can then be rolled into the desired forked tubular form shown in the drawing. If desired, the tubular member can also be molded out of plastic or other suitable material.

In order to trap the protruding spherical surfaces of the block 20 in the concave seats 16 the guide grooves 18 are inclined so that the distance between the diametrically opposed grooves progressively decreases from the ends of the arms to the concave seats. Furthermore, in order to provide a preload and intimate lash-free contact between the protruding spherical surfaces and the concave seats the block 20 is fabricated so that the distance between the diametrically opposed protruding surfaces is somewhat greater than the distance between the diametrically opposed concave seats. This will produce a slight interference and provide the desired preload.

The advantages and many applications of the universal joint which has the foregoing described features will be obvious to those skilled in the art. Furthermore, although this invention has been described in connection with a specific embodiment it will be obvious to those skilled in the art that various changes may be made in the form, structure, and arrangement of parts without departing from the spirit of the invention.

Accordingly, I do not desire to be limited to the specific embodiment disclosed herein primarily for purposes of illustration but instead desire protection falling within the scope of the appended claims.

Having thus described the various features of the invention what I claim as new and desire to secure by Letters Patent is:

1. A universal joint comprising two members capable of being rotated with their axes angularly disposed with respect to one another, a pair of spaced arms located at the end of each of said rotatable members, diametrically opposed concave seats formed in the arms of each of said rotatable members, said seats of one of said members being centered in the same plane with the seats of the other of said members but at right angles with respect thereto, a block interposed between said spaced arms, said block having diametrically opposed protruding spherical surfaces formed thereon which are received in said concave seats, and means formed in the arms of each of said rotatable members for guiding and permitting movement of said protruding spherical surfaces into trapped engagement with said concave seats during assembly.

2. A universal joint, as defined in claim 1, wherein said last named means includes diametrically opposed grooves formed in the arms of each of said rotatable members which extend from the ends of said arms to said concave seats.

3. A universal joint, as defined in claim 2, wherein said diametrically opposed grooves are inclined so that the distance therebetween progressively decreases from the ends of said arms to said concave seats.

4. A universal joint, as defined in claim 3, wherein the distance between the diametrically opposed protruding surfaces is sufficiently greater than the distance between the diametrically opposed concave seats to provide a preload and intimate lash-free contact therebetween.

5. A universal joint, as defined in claim 4, wherein each of said rotatable members comprises a tube formed with said arms extending therefrom.

6. A universal joint, as defined in claim 5, wherein each of said rotatable members is comprised of sheet material which has been stamped to include said arms with said grooves and concave seats formed therein and then rolled into a tube.

References Cited

UNITED STATES PATENTS

| | | | |
|---|---|---|---|
| 1,389,422 | 8/1921 | Curtis | 64—17 |
| 1,705,731 | 3/1929 | Hufferd | 64—17 |
| 1,913,045 | 6/1933 | Wood | 64—17 |
| 2,208,547 | 7/1940 | Murphy | 64—17 |
| 2,879,651 | 3/1959 | Leto et al. | 64—17 |

HALL C. COE, *Primary Examiner.*